US006644100B2

(12) United States Patent
Fritz et al.

(10) Patent No.: US 6,644,100 B2
(45) Date of Patent: Nov. 11, 2003

(54) METHOD FOR CONDUCTING A LEAK TEST OF A TANK VENTILATION SYSTEM OF A VEHICLE

(75) Inventors: Thorsten Fritz, Gaggenau (DE); Lutz Reuschenbach, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/980,902

(22) PCT Filed: Mar. 15, 2001

(86) PCT No.: PCT/DE01/00987

§ 371 (c)(1), (2), (4) Date: Dec. 16, 2001

(87) PCT Pub. No.: WO01/77517

PCT Pub. Date: Oct. 18, 2001

(65) Prior Publication Data

US 2002/0157456 A1 Oct. 31, 2002

(30) Foreign Application Priority Data

Apr. 6, 2000 (DE) ........................................ 100 16 951
Apr. 20, 2000 (DE) ........................................ 100 19 935

(51) Int. Cl.[7] ................................................ G01M 3/04
(52) U.S. Cl. .......................................... 73/49.7; 702/51
(58) Field of Search ................................ 73/40, 40.5 R, 73/118.1, 49.7; 123/520, 518, 519; 702/51

(56) References Cited

U.S. PATENT DOCUMENTS 5,182,945 A 2/1993 Setter
5,205,263 A * 4/1993 Blumenstock et al. ...... 123/520
5,474,050 A * 12/1995 Cook et al. ................. 123/520
5,476,083 A * 12/1995 Blumenstock .............. 123/520
5,572,981 A 11/1996 Pfleger et al.
5,592,923 A * 1/1997 Machida ..................... 123/520
5,604,305 A * 2/1997 Denz et al. ................ 73/118.1
5,718,210 A * 2/1998 Ito et al. ...................... 123/520
5,890,474 A 4/1999 Schnaibel et al.
6,112,728 A * 9/2000 Schwegler et al. ......... 123/520
6,119,663 A * 9/2000 Okuma ........................ 123/520
6,131,550 A * 10/2000 Fritz et al. .................. 123/520
6,161,423 A * 12/2000 Okuma .......................... 74/40
6,334,355 B1 * 1/2002 Grieve et al. ................ 73/49.7

FOREIGN PATENT DOCUMENTS

EP 0 611 674 8/1994
JP 11 343926 12/1999

* cited by examiner

*Primary Examiner*—Hezron Williams
*Assistant Examiner*—Charles D Garber
(74) *Attorney, Agent, or Firm*—Walter Ottesen

(57) ABSTRACT

A method for checking the tightness of a tank-venting system of a vehicle wherein one introduces an overpressure or underpressure compared to the atmospheric pressure via a pressure source alternately into the tank-venting system and a reference leak of a defined size connected in parallel to the tank-venting system over a pregiven time interval and wherein one detects at least one operating characteristic variable of the pressure source when introducing the pressure into the tank-venting system (tank measurement) as well as when introducing the pressure into the reference leak (reference measurement) and wherein one compares the two measurements and, when there is a deviation of the tank measurement from the reference measurement by a pregivable value, one draws a conclusion as to a leak when there is a deviation of the tank measurement from the reference measurement by a pregivable value and the method is characterized in that one draws a conclusion as to the operability of the tank-venting valve of the tank-venting system from the time-dependent trace of the operating characteristic variable for the tank measurement.

8 Claims, 2 Drawing Sheets

(State of the Art)

METHOD FOR CONDUCTING A LEAK TEST OF A TANK VENTILATION SYSTEM OF A VEHICLE

FIELD OF THE INVENTION

The invention relates to a method for checking the tightness of a tank-venting system of a vehicle.

BACKGROUND OF THE INVENTION

Methods for checking tightness are shown, for example, in German patent publications 196 36 431 or from 198 09 384.

In these methods, air is pumped into the tank-venting system with a pressure source. In this way, a pressure builds up in a tight tank-venting system. The increased pressure changes the operating characteristic variable of the pressure source, that is, for example, the electrical current requirement of the pump of the pressure source is increased. The measurement of the pump current thereby defines an index for the pressure in the tank. The pump current is measured at the start of the pumping operation and after the elapse of a pregiven time interval. An increase of the current is expected in a tight tank-venting system because of the pressure which builds up therein. A fault announcement "leakage" is outputted when the current increase drops below an expected pregivable amount.

A tightness check of this kind can be successful only when there is a tight tank-venting valve. For example, a tank-venting valve (jammed in the open position), which is disturbed in its operation, can lead to an untight tank system. The operation of the tanking valve can be checked in different ways. For example, the current, which is required for driving the tank-venting valve, can be detected and evaluated or tank-venting valves can be used whose switch positions can be read out.

Operational checks of the tank-venting valve of this kind require additional electrical lines and additional circuit complexity. These operational checks therefore not only require a technical complexity but especially also a disadvantageous cost.

SUMMARY OF THE INVENTION

In view of the above, it is an object of the invention to so improve a method for checking the tightness of a tank-venting system of a vehicle of the above kind so that a reliable check of the operability of the tank-venting valve is possible with the least amount of technical complexity.

The basic idea of the invention is to draw a conclusion during tightness checks based on the time-dependent trace of the operating variable. For this purpose, the time-dependent trace of the operating variable is detected during the tank measurement and a conclusion is drawn as to the operability of the tank-venting valve from this time-dependent trace. A significant advantage of this method is that no additional lines, circuits, or the like are required in order to check the operability of the tank-venting valve. Rather, the time-dependent trace of the operating variable is evaluated during the tank measurement for checking the operability of the tank-venting valve which anyway takes place.

A comparison to a reference measurement can take place as well as a comparison to a threshold which is derived from operating variables for controlling an internal combustion engine of the vehicle or is fixedly pregiven.

An advantageous embodiment of the method provides opening the tank-venting valve after the end of a tank measurement; detecting the time-dependent trace of the operating variable; and, drawing a conclusion as to the operability of the tank-venting valve when the operating characteristic variable drops by a pregiven value within a pregiven time. In this embodiment, a check can be made in a simple manner as to whether the tank-venting valve is jammed in the closed state. In this case, no leak would be detected but nonetheless a proper functioning of the tank-venting system would not be ensured.

In another embodiment wherein the tightness of the tank-venting valve is checked, it is provided that the time-dependent trace of the operating characteristic variable is detected during a tank measurement executed during idle of the internal combustion engine of the vehicle (idle measurement). Then, the time-dependent trace of the operating variable is detected in a tank measurement carried out for a switched off internal combustion engine of the vehicle (run-on measurement) and a conclusion is drawn as to a disturbance of the tank-venting valve when the time-dependent gradient of the operating characteristic variable for the idle measurement departs from the comparable time-dependent gradient of the operating characteristic variable during the run-on measurement by a pregiven value. In this way, a check of the tightness of the tank-venting valve is possible in the closed state. In this way, especially a very fine leak in the tank-venting can be distinguished from a very fine leak at another location in the tank-venting system.

As mentioned above, one or more of the following variables can be used as operating characteristic variables: the current take-up by the pressure source and/or the rpm of the pressure source and/or the voltage applied to the pressure source and/or the pressure generated by the pressure source.

Insofar as a reference leak is used, it is preferably switched in parallel to the tank-venting system.

BRIEF DESCRIPTION OF THE DRAWINGS

The invention will now be described with reference to the of drawings wherein.

DESCRIPTION OF THE PREFERRED EMBODIMENTS OF THE INVENTION

Figure 1:
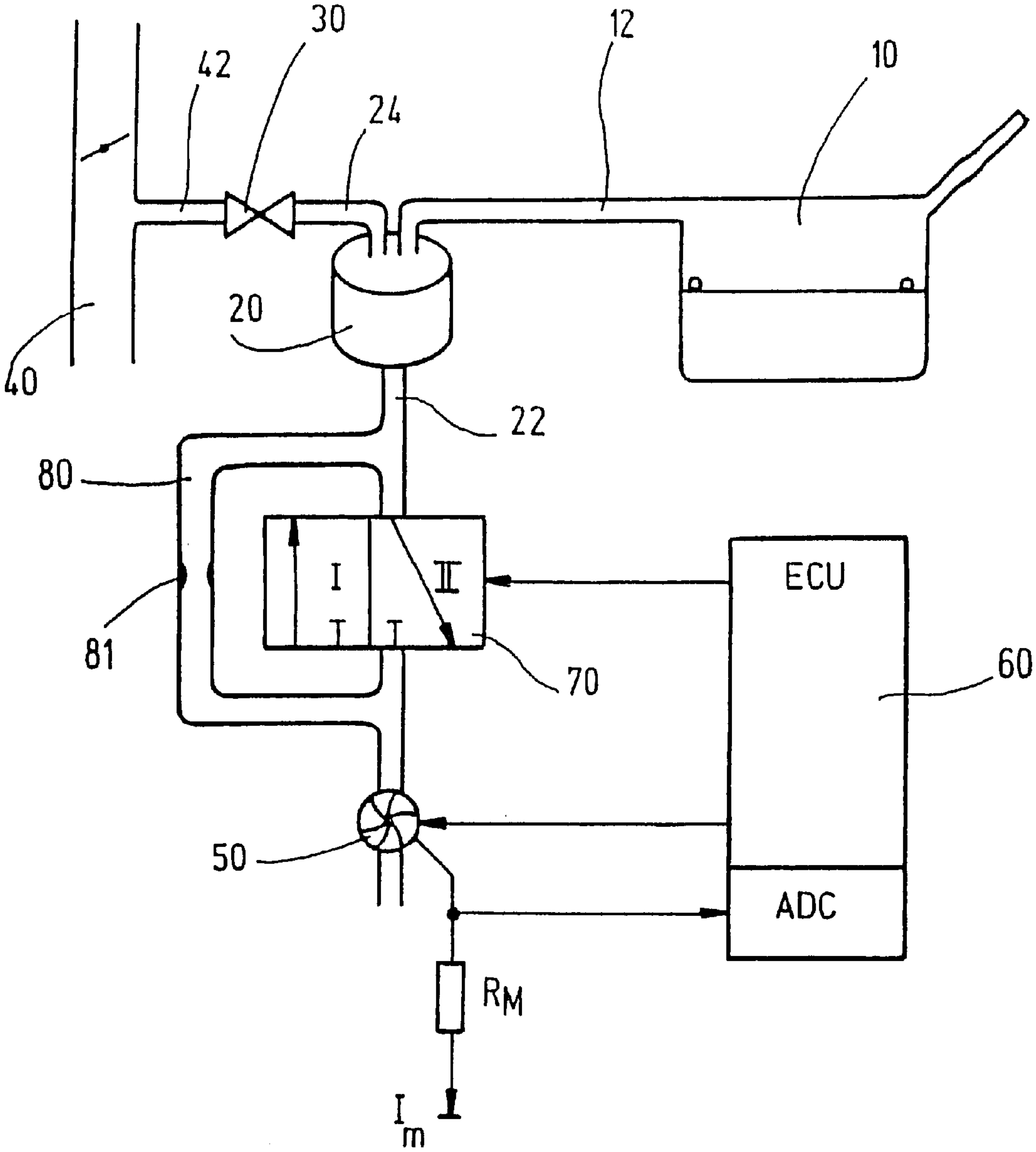
FIG. 1 shows a tank-venting system, which is known from the state of the art, wherein the method, which makes use of the invention, is applied.

A tank-venting system of a motor vehicle, which is known from the state of the art, is shown in FIG. 1 and includes a tank 10, an adsorption filter 20 as well as a tank-venting valve 30. The adsorption filter 20 is, for example, an active charcoal filter which is connected to the tank 10 via a tank connecting line 12 and has a venting line 22 which can be connected to the ambient. The tank-venting valve 30 is, on the one hand, connected to the adsorption filter 20 via a valve line 24 and, on the other hand, is connected to an intake manifold 40 of an internal combustion engine (not shown) via a valve line 42.

Hydrocarbons develop in the tank 10 because of vaporization and these hydrocarbons deposit in the adsorption filter 20. For regenerating the adsorption filter 20, the tank-venting valve 30 is opened so that air of the atmosphere is drawn by suction through the adsorption filter 20 because of the underpressure present in the intake manifold 40 whereby the hydrocarbons deposited in the adsorption filter 20 are drawn by suction into the intake manifold 40 and are supplied to the engine.

In order to be able to diagnose the operability of the tank-venting system, a pump 50 is provided which is driven, for example, by an electric motor. The pump 50 is connected to a circuit unit (electronic control unit, ECU) 60. A switchover valve 70 is connected downstream of the pump 50 and is, for example, in the form of a 3/2 directional valve. In a separate branch 80, a reference leak 81 is arranged parallel to this switchover valve 70. The size of the reference leak 81 is so selected that it corresponds to the size of the leak to be detected. The size of the leak is, for example, 0.5 mm. The reference leak 81 can, for example, also be part of the switchover valve 70 by means of a channel constriction or the like, so that, in this case, an additional reference part is not needed (not shown).

The pump 50 is actuated for checking the tightness of the tank-venting system and an overpressure is introduced alternately into the tank-venting system and, via a switchover of the valve 70, into the reference leak 81. In this way, the current $I_M$, which is supplied to the pump motor and which drops via a resistor $R_M$, is detected and supplied to the circuit unit 60 via an analog-digital converter ADC. The trace shown in FIG. 2 corresponds to the time-dependent trace of the motor current $I_M$ of an operable tank-venting system without leakage. In the time interval, which is characterized as "reference measurement" in FIG. 2, the switchover valve 70 is in the position shown in FIG. 1 and identified by I. In this position of the switchover valve 70, a pumping current is introduced by the pressure source 50 into the tank-venting system via the reference leak 80. Here, a motor current $I_M$ adjusts which is essentially constant over time as shown schematically in FIG. 2. In lieu of the reference measurement, a threshold is also conceivable which is derived from other operating variables of the control of the internal combustion engine or which, for example, is also fixedly pregiven (not shown in FIGS. 2 and 3).

As soon as the switchover valve 70 is switched from the position I into the position II (see FIG. 1), the pressure source 50 charges the tank-venting system with an overpressure. With the switchover, the motor current $I_M$ falls off rapidly and, thereafter, increases continuously with increasing time until the current reaches a value which is greater or equal to the motor current of the reference measurement. At the lower edge of FIG. 2, the switch positions of the tank-venting valve (identified in FIGS. 2 and 3 by TEV) as well as of the switchover valve 70 (identified by UV in FIG. 2) are shown for the above-described measurements.

A conclusion as to a leak is drawn when the motor current $I_M$ of the tank measurement does not reach the value of the motor current of the reference measurement after the elapse of a pregiven time interval. If this value is reached, then, as shown schematically in FIG. 2, no leak is present and a conclusion as to a tight tank system is drawn.

Figure 2:
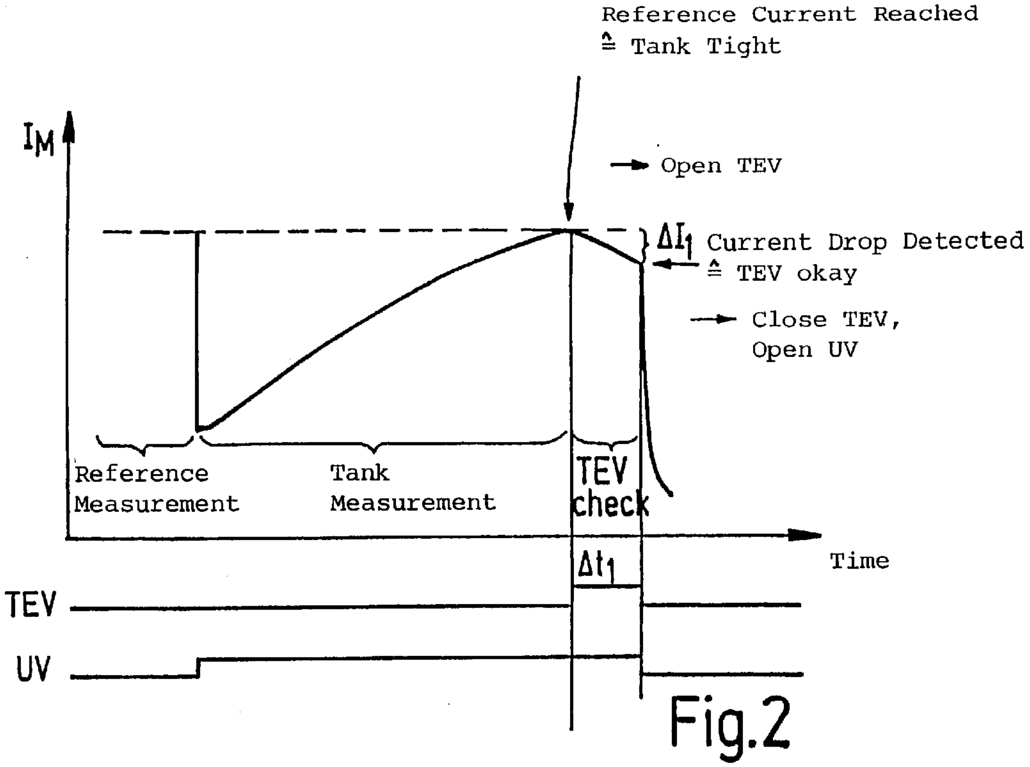
FIG. 2 schematically shows the trace of the pump current as a function of time in a first embodiment of the method of the invention; and, FIG. 3 schematically shows the trace of the pump current as a function of time in a second embodiment of the method of the invention.

To now check whether the tank-venting valve 30 opens properly, the tank-venting valve 30 is opened in the case of a tight venting system as shown in FIG. 2, that is, the tank-venting valve 30 is opened when the motor current of the tank measurement reaches the value of the motor current of the reference measurement. The motor current drops with increasing time for a correctly opening tank-venting valve 30. If the motor current drops at least by a pregiven value $\Delta I_1$ in a time interval of the length $\Delta t_1$, it can be assumed that the tank-venting valve 30 opens correctly. If this is not the case, then a proper operation of the tank-venting valve 30 is not given.

Figure 3:
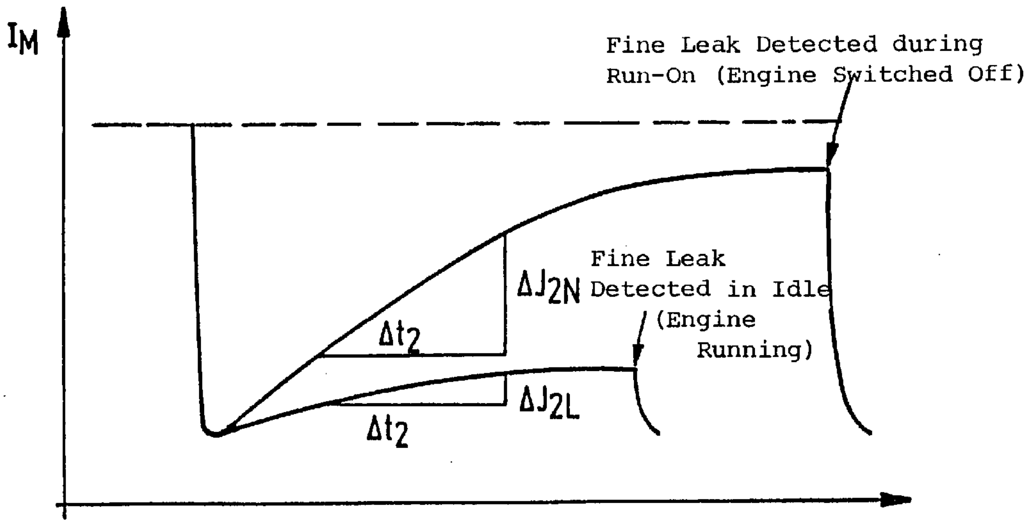

In another embodiment described in connection with FIG. 3, a tank-venting valve 30 can be detected which does not close correctly. In this embodiment, a tank measurement is carried out during idle of the internal combustion engine. A change of the current $\Delta I_{2N}$, that is, the current gradient, is measured and stored in a time interval $\Delta t_2$.

Furthermore, for a switched off internal combustion engine, that is, during run-on, a tank measurement is carried out (run-on measurement). Here, in the same time interval $\Delta t_2$, a change of the current $\Delta I_{2N}$ (that is, again the current gradient) is detected. In FIG. 3, the two time-dependent sequential measurements are shown one above the other to make clearer the contrast of the detected current gradients. It is understood that these measurements follow one another independently of their sequence. These two current gradients are compared to determine a leak in the tank-venting valve as will be explained in greater detail below.

If a very fine leak is detected, for example, during a tank measurement, then an untight tank-venting valve 30 could be considered. In order to check this, the current gradient is detected during a tightness check in the control apparatus run-on over a pregiven time interval $\Delta t_2$. With the internal combustion engine switched off, ambient pressure is present at the tank-venting valve 30 facing toward the intake manifold end. If a tightness check is carried out for a running engine over the same time interval $\Delta t_2$, for which an intake manifold underpressure is present of 200 to 400 hPa and when one compares the current gradient of the idle measurement to the previously measured current gradient of the run-on measurement (detected over the same time interval), a conclusion can be drawn as to a leak in the tank-venting valve 30 with the run-on measurement if the current increase $\Delta I_{2N}$ during the run-on measurement exceeds the current increase $\Delta I_{2L}$ for the idle measurement by a pregiven value: $\Delta I_{2N} > \Delta I_{2L}$+pregiven value. In this case, the increased pressure drop across the leak (for example, assumed) in the tank-venting valve 30 provides for an additional drop of the overpressure in the tank.

It is here noted that the two above-described embodiments for checking whether the tank-venting valve opens correctly as well as the check as to whether the tank-venting valve closes correctly can also be combined with each other.

In each case, it is possible to carry out the operability of the tank-venting valve 30 in combination with a tightness check of the tank-venting system which is anyway present. Especially no additional lines or the like are required. Rather, the method can be utilized practically in any desired tank-venting system wherein a tightness check is carried out.

What is claimed is:

1. A method for checking the tightness of a tank-venting system of a vehicle, the method comprising the steps of:
   - introducing an overpressure or underpressure compared to the atmospheric pressure utilizing a pressure source alternately into the tank-venting system and a reference leak of a defined size connected in parallel to the tank-venting system over a pregiven time interval;
   - detecting at least one operating characteristic variable of the pressure source when introducing the pressure into the tank-venting system (tank measurement) as well as when introducing the pressure into the reference leak (reference measurement);
   - comparing the two measurements;
   - drawing a first conclusion as to a leak in said tank-venting system when there is a deviation of the tank measurement from the reference measurement by a pregivable value; and, drawing a second conclusion during tank measurement as to the operability of the tank-venting valve of the tank-venting system from the time-dependent trace of the operating characteristic variable detected for the tank measurement.

2. The method of claim 1, comprising the further step of using, as an operating characteristic variable, at least one of the following variables: the current take-up of the pressure source; the rpm of the pressure source; the voltage applied to the pressure source; and, the pressure generated by the pressure source.

3. A method for checking the tightness of a tank-venting system of a vehicle, the method comprising the steps of:

introducing an overpressure or underpressure compared to the atmospheric pressure utilizing a pressure source alternately into the tank-venting system and a reference leak of a defined size connected in parallel to the tank-venting system over a pregiven time interval;

detecting at least one operating characteristic variable of the pressure source when introducing the pressure into the tank-venting system (tank measurement) as well as when introducing the pressure into the reference leak (reference measurement);

comparing the two measurements;

drawing a conclusion as to a leak when there is a deviation of the tank measurement from the reference measurement by a pregivable value;

drawing a conclusion as to the operability of the tank-venting valve of the tank-venting system from the time-dependent trace of the operating characteristic variable for the tank measurement;

after ending the tank measurement, opening the tank-venting valve and detecting the time-dependent trace of the operating characteristic variable; and, drawing a conclusion as to the operability of the tank-venting valve when the operating characteristic variable drops by a pregiven value within a pregiven time.

4. A method for checking the tightness of a tank-venting system of a vehicle, the method comprising the steps of:

introducing an overpressure or underpressure compared to the atmospheric pressure utilizing a pressure source alternately into the tank-venting system and a reference leak of a defined size connected in parallel to the tank-venting system over a pregiven time interval;

detecting at least one operating characteristic variable of the pressure source when introducing the pressure into the tank-venting system (tank measurement) as well as when introducing the pressure into the reference leak (reference measurement);

comparing the two measurements;

drawing a conclusion as to a leak when there is a deviation of the tank measurement from the reference measurement by a pregivable value;

drawing a conclusion as to the operability of the tank-venting valve of the tank-venting system from the time-dependent trace of the operating characteristic variable for the tank measurement;

detecting the time-dependent trace of the operating characteristic variable during a tank measurement carried out during idle of an internal combustion engine (idle measurement);

detecting the time-dependent trace of the operating characteristic variable in a tank measurement executed for a switched off internal combustion engine of the motor vehicle (run-on measurement); and, drawing a conclusion as to a disturbance of the tank-venting valve when the time-dependent gradient of the operating characteristic variable during the idle measurement deviates from the comparable time-dependent gradient of the operating characteristic variable during the run-on measurement by a pregiven value.

5. A method for checking the tightness of a tank-venting system of a vehicle, the method comprising the steps of:

introducing an overpressure or an underpressure compared to the atmospheric pressure utilizing a pressure source into the tank-venting system;

detecting at least one operating characteristic variable of the pressure source when introducing the pressure into the tank-venting system (tank measurement);

comparing the measured operating characteristic variable to a threshold, which is derived from operating variables of the control of an engine of the vehicle or is fixedly pregiven;

drawing a first conclusion as to the presence of a leak in said tank-venting system when there is a deviation of the tank measurement from the threshold by a pregiven value; and, drawing a second conclusion during tank measurement as to the operability of the tank-venting valve of the tank-venting system from the time-dependent trace of the operating characteristic variable detected during the tank measurement.

6. The method of claim 5, comprising the further step of using, as an operating characteristic variable, at least one of the following variables: the current take-up of the pressure source; the rpm of the pressure source; the voltage applied to the pressure source; and, the pressure generated by the pressure source.

7. A method for checking the tightness of a tank-venting system of a vehicle, the method comprising the steps of:

introducing an overpressure or an underpressure compared to the atmospheric pressure utilizing a pressure source into the tank-venting system;

detecting at least one operating characteristic variable of the pressure source when introducing the pressure into the tank-venting system (tank measurement);

comparing the measured operating characteristic variable to a threshold, which is derived from operating variables of the control of an engine of the vehicle or is fixedly pregiven;

drawing a conclusion as to the presence of a leak when there is a deviation of the tank measurement from the threshold by a pregiven value;

drawing a conclusion as to the operability of the tank-venting valve of the tank-venting system from the time-dependent trace of the operating characteristic variable during the tank measurement;

after ending the tank measurement, opening the tank-venting valve and detecting the time-dependent trace of the operating characteristic variable; and, drawing a conclusion as to the operability of the tank-venting valve when the operating characteristic variable drops by a pregiven value within a pregiven time.

8. A method for checking the tightness of a tank-venting system of a vehicle, the method comprising the steps of:

introducing an overpressure or an underpressure compared to the atmospheric pressure utilizing a pressure source into the tank-venting system;

detecting at least one operating characteristic variable of the pressure source when introducing the pressure into the tank-venting system (tank measurement);

comparing the measured operating characteristic variable to a threshold, which is derived from operating variables of the control of an engine of the vehicle or is fixedly pregiven;

drawing a conclusion as to the presence of a leak when there is a deviation of the tank measurement from the threshold by a pregiven value;

drawing a conclusion as to the operability of the tank-venting valve of the tank-venting system from the time-dependent trace of the operating characteristic variable during the tank measurement;

detecting the time-dependent trace of the operating characteristic variable during a tank measurement carried out during idle of an internal combustion engine (idle measurement);

detecting the time-dependent trace of the operating characteristic variable in a tank measurement executed for a switched off internal combustion engine of the motor vehicle (run-on measurement); and, drawing a conclusion as to a disturbance of the tank-venting valve when the time-dependent gradient of the operating characteristic variable during the idle measurement deviates from the comparable time-dependent gradient of the operating characteristic variable during the run-on measurement by a pregiven value.

* * * * *